United States Patent [19]

Kinyon et al.

[11] Patent Number: 4,564,216
[45] Date of Patent: Jan. 14, 1986

[54] CREEPER RAMP RACK

[76] Inventors: John P. Kinyon; George Spector, both of 233 Broadway, RM 3615, New York, N.Y. 10007

[21] Appl. No.: 547,079

[22] Filed: Oct. 31, 1983

[51] Int. Cl.⁴ .......................... B60P 1/00; B62B 11/00
[52] U.S. Cl. .................................... 280/770; 280/32.6; 296/10; 414/537
[58] Field of Search ............... 280/748, 32.6, 30, 770, 280/164 R; 52/632, 202, 802; 296/10, 151, 12, 13, 95 R, 32, 43, 84 K, 61; 49/50, 55; 414/537; 160/DIG. 2, DIG. 3

[56] References Cited

U.S. PATENT DOCUMENTS

| | | | |
|---|---|---|---|
| 3,930,680 | 1/1976 | Littlefield | 296/10 |
| 3,989,148 | 11/1976 | Donohue | 414/537 |
| 4,003,483 | 1/1977 | Fulton | 414/537 |
| 4,098,414 | 7/1978 | Abiera | 414/537 |
| 4,397,127 | 8/1983 | Mieyal | 52/632 |
| 4,399,640 | 8/1983 | Porter | 52/202 |

Primary Examiner—Joseph F. Peters, Jr.
Assistant Examiner—Everett G. Diederiks, Jr.

[57] ABSTRACT

A creeper-ramp rack to be stored in a pair of standards on a pick-up truck is provided and consists of a pair of rectangular grillwork panels, each having a pair of C-shaped channel members that slideably engage each other so as in one position to be stored in the pair of standards on the pick-up truck to form a protecting grill for rear window and in another position lengthened to be placed on rear end of truck bed to form a ramp strong enough to support a man and a motorcycle. A castor can snap into each corner of the panel on the channel member to form a creeper.

3 Claims, 6 Drawing Figures

CREEPER RAMP RACK

BACKGROUND OF THE INVENTION

The instant invention relates generally to work racks and more specifically it relates to a creeper-ramp rack to be stored in a pair of standards on a pick-up truck.

Many people load heavy objects into the back of pick-up trucks such as lawn mowers, bicycles, motorcycles, furniture, etc. There is no standard pick-up rack. They come in a multitude of styles. Once the grill is installed it does nothing but protect the back window glass. Since it has no other uses it is not desirable so accordingly it is in need of an improvement.

Numerous work racks have been provided in prior art that are adapted to aid mechanics in making repairs. For example, U.S. Pat. Nos. 1,538,437; 2,843,391 and 3,677,569 all are illustrative of such prior art. While these units may be suitable for the particular purpose to which they address, they would not be as suitable for the purposes of the present invention as heretofore described.

SUMMARY OF THE INVENTION

A principle object of the present invention is to provide a creeper-ramp rack to be stored in a pair of standards on a pick-up truck to form a protective grill for rear window of the pick-up truck.

Another object is to provide a creeper-ramp rack to form a ramp strong enough to support a man and a motorcycle.

An additional object is to provide a creeper-ramp rack that has four snap on castors, one at each corner to form a creeper.

A further object is to provide a creeper-ramp rack that is simple and easy to use.

A still further object is to provide a creeper-ramp rack that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appened claims.

BRIEF DESCRIPTION OF THE DRAWING FIGURES

The figures thereon are briefly described in the following manner:

DETAILED DESCRIPTION OF THE PREFERRED EMBODIMENTS

Figure 1:
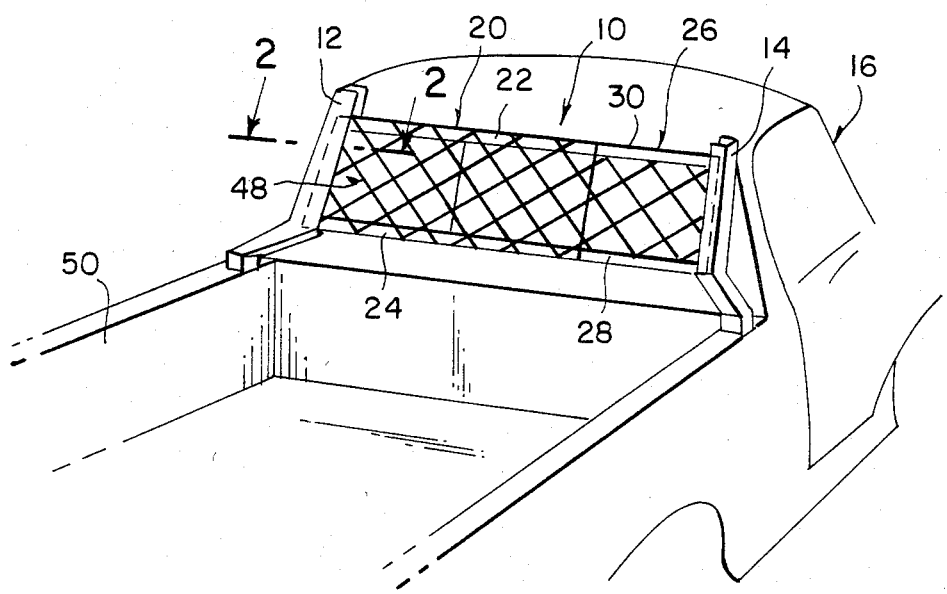
FIG. 1 is a perspective view showing the invention mounted on a ramp rack on the truck behind the rear window.
Figure 2:
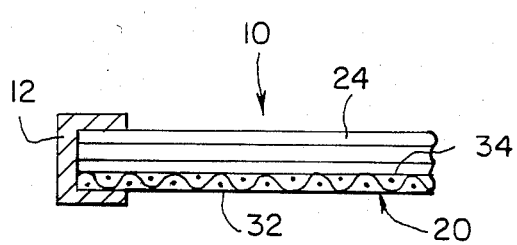
FIG. 2 is a cross sectional view taken along line 2—2 of FIG. 1.
Figure 4:
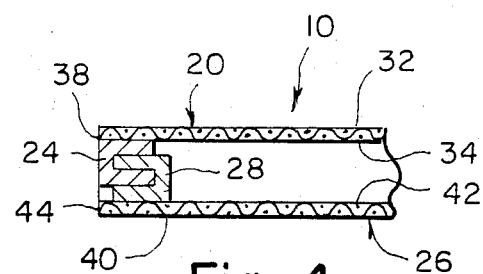
FIG. 4 is a cross sectional view taken along line 4—14 of FIG. 3.
Figure 3:
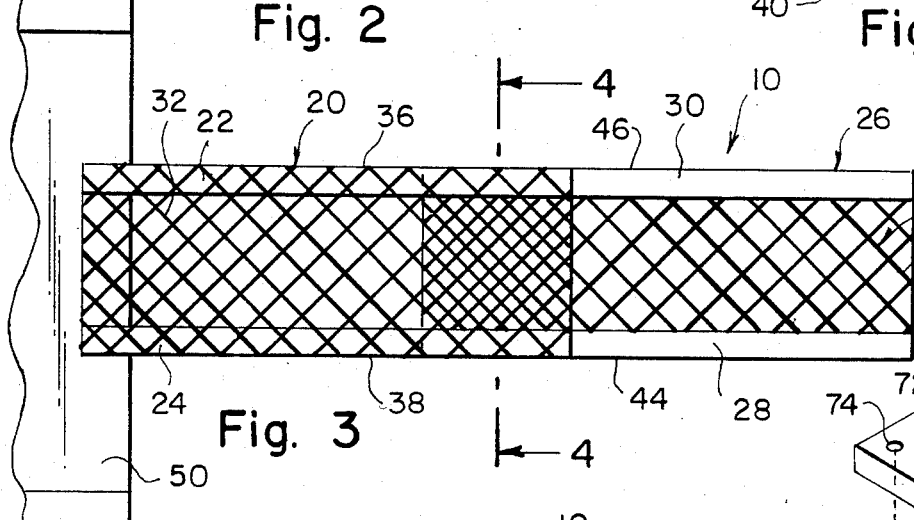
FIG. 3 is a top view of the ramp creeper device supported at the truck rear end for use as a ramp.

Turning now descriptively to the drawings, in which similar reference characters denote similar elements throughout the several views, the FIGS. 1 through 6 illustrates a creeper-ramp rack 10 to be stored in a pair of standards 12 and 14 behind the rear window of a pick-up truck 16. The creeper-ramp rack 10 consists of a first rectangular grillwork panel 20, a first pair of C-shaped channel members 22 and 24, a second rectangular grillwork panel 26 and a second pair of C-shaped channel members 28 and 30. The rack 10 when stored in standards 12 and 14 protects the rear window as seen in FIG. 1.

The first rectangular grillwork panel 20 has a top face 32 and a bottom face 34. The channel members 22 and 24 are affixed to opposite sides 36 and 38 of the bottom face 34 of the first panel 20.

The second rectangular grillwork panel 26 has a top face 40 and a bottom face 42. The channel members 28 and 30 are affixed to opposite sides 44 and 46 of the bottom face 42 of the second panel 26.

The second pair of channel members 28 and 30 slideably engage the oppositely first pair of channel members 22 and 24 (See FIG. 3) so as in one position to be stored in the pair of standards 12 and 14 on the pick-up truck 16 to form a protecting grill 48 for rear window of the pick-up truck 16 (see FIG. 1). In another position see FIG. 4 the creeper-ramp rack 10 is lengthened by slidingly engaging channel 24 with 28 and channel 22 with 30 of the panels to be placed on rear end of truck bed 50 to form a ramp 52 strong enough to support a man and a motorcycle (see FIG. 3).

Figure 5:
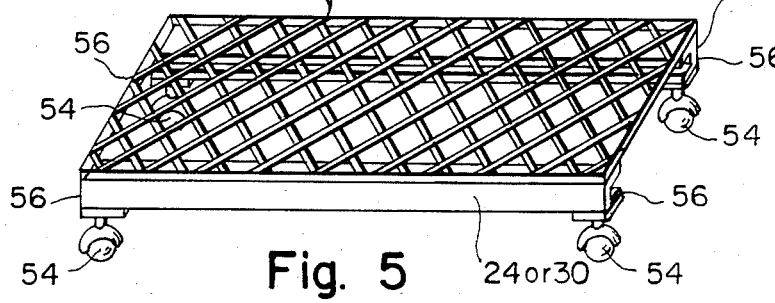
FIG. 5 is a perspective view of the ramp converted for use as a creeper.

In FIG. 5 the creeper-ramp rack 10 further contains four casters 54. Each castor 54 is mounted on into a corner 56 of either panel 20 or 26 on the channel members 24 and 26 or 28 and 30.

Figure 6:
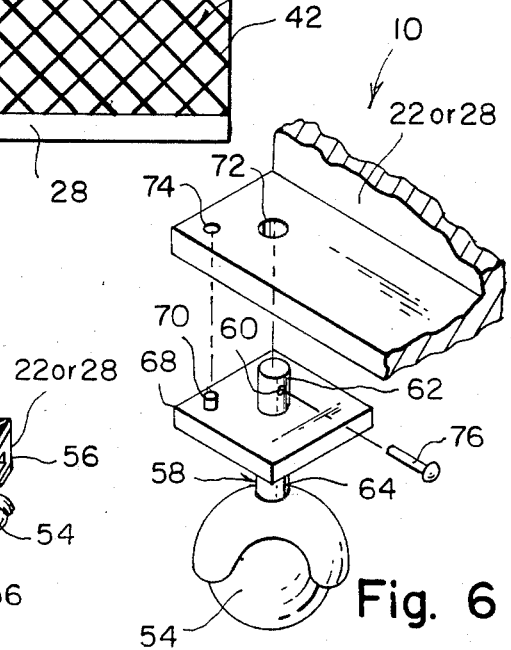
FIG. 6 is an exploded perspective view partly in section showing the means for converting the ramp into a creeper.

FIG. 6 shows the castor 54 in greater detail. A shaft 58 is provided and has a transverse aperture 60 at top end 62 with bottom end 64 mounted to top of the castor 54. A mounting plate 68 is attached to middle of the shaft 58. A positioning pin 70 is affixed to top of the mounting plate 68 so that top 62 of the shaft 58 and the positioning pin 70 can enter apertures 72 and 74 in the channel member 22 or 28. A pin 76 will enter the transverse aperture 60 at top end 62 of the shaft 58 when the shaft 58 is placed through aperture 72 in the channel member 22 or 28. The pin 76 holds the shaft 58 from falling out of the aperture 72 in the channel 22 or 28 when the panel 20 or 26 is picked up off the floor.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A creeper ramp rack adapted to be stored in a pair of standards located immediately behind the rear window of a pick-up truck wherein said standards have oppositely disposed means for receiving said rack, comprising:
   (a) a first rectangular grillwork panel having top and bottom faces;
   (b) a first pair of C-shaped channels each having a first pair of spaced parallel sides, one of said first pair of spaced parallel sides of each C-shaped channel is affixed, in the longitudinal direction, on opposite ends of the bottom face of said first panel;

(c) a second rectangular grillwork panel having top and bottom faces; and (d) a second pair of C-shaped channels each having a second pair of spaced parallel sides, one of said second pair of spaced parallel sides of each C-shaped channel is affixed, in the longitudinal direction, on opposite ends of the bottom face of said second panel, said first pair and said second pair of C-shaped channels being disposed such that the other of said first pair of spaced parallel sides is received within the space between the parallel sides of said second pair of C-shaped channels and the other of said second pair of spaced parallel sides is received within the space between the parallel sides of said first pair of C-shaped channels so that the two pairs of C-shaped channels slideably engage one another, whereby in one position said rack may be stored in said pair of standards on the pick-up truck to form a protecting grill for the rear window of the pick-up truck and in another position may be lengthened to be placed on the rear end of the truck bed to form a ramp.

2. A creeper ramp rack as recited in claim 1, that further comprises four castors, each castor having means for mounting on each corner of said panels to form a creeper.

3. A creeper ramp rack as recited in claim 2, wherein each said castor further comprises:

(a) a shaft having a transverse aperture at top end with bottom end mounted to top of said castor;

(b) a mounting plate attached to middle of said shaft;

(c) a positioning pin affixed to top of said mounting plate so that the top of said shaft and said positioning pin can enter apertures in said channel member; and (d) a pin to enter said transverse aperture at top end of said shaft when said shaft is placed through aperture in said channel member, said pin holds said shaft from falling out of the aperture in said channel when said panel is picked up off floor.

* * * * *